Sept. 17, 1929.  E. C. RANEY  1,728,305
OIL FILTER
Filed Sept. 29, 1928    3 Sheets-Sheet 1
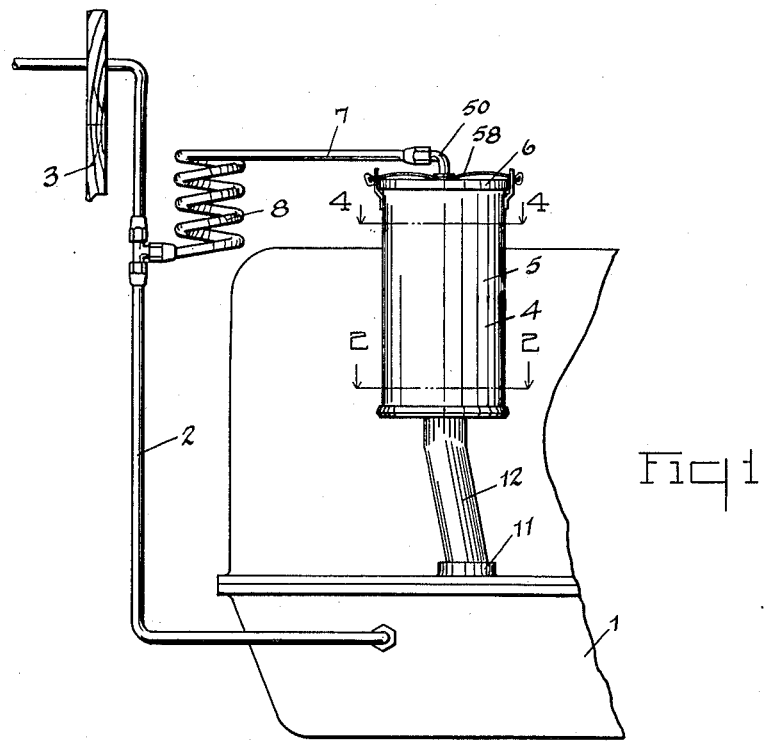
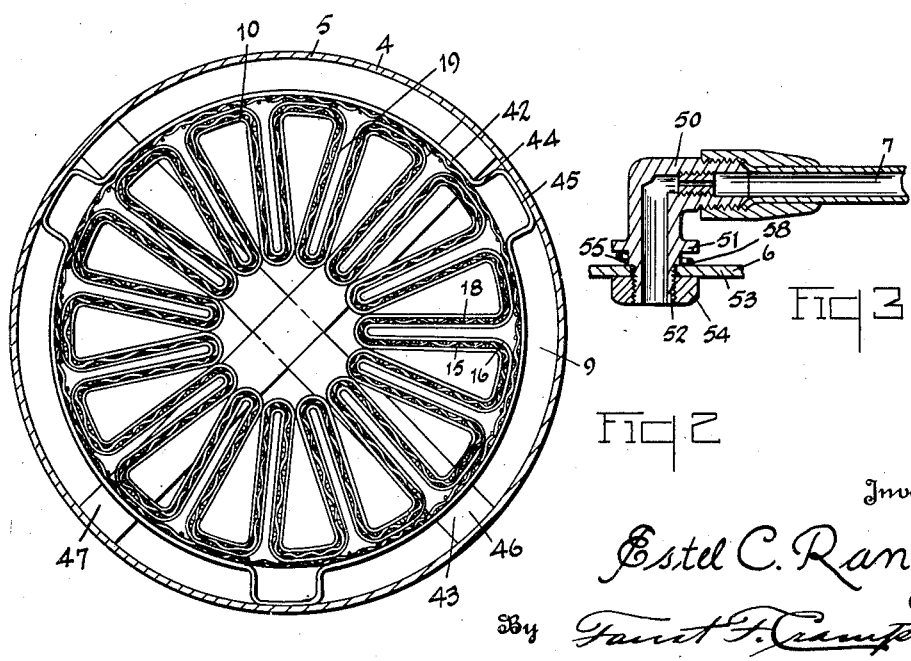
Inventor
Estel C. Raney
By Faust F. Crampton
Attorney

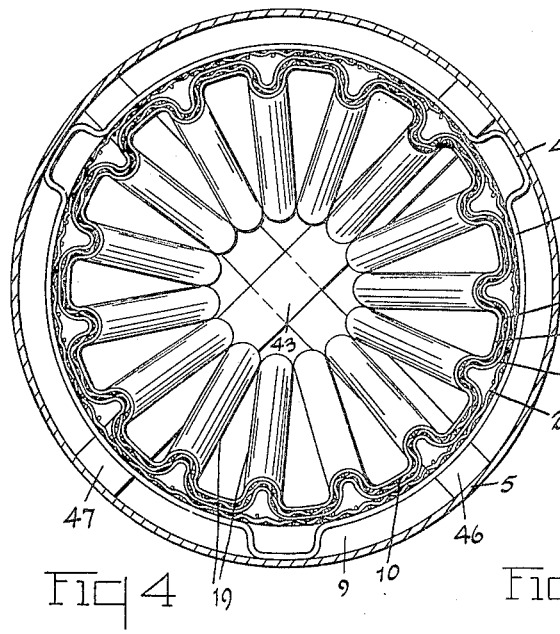
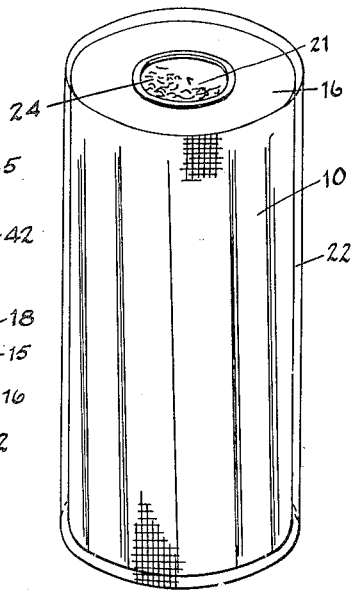
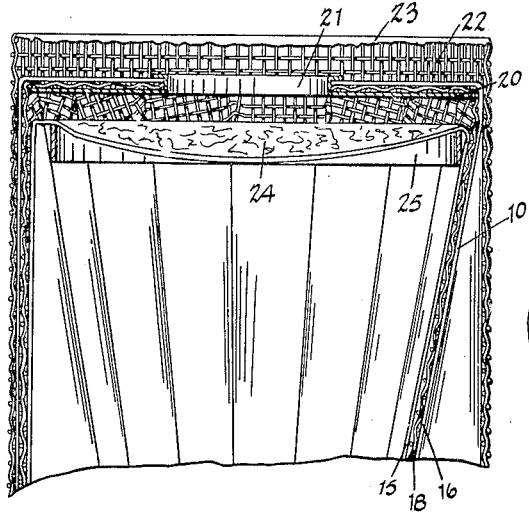
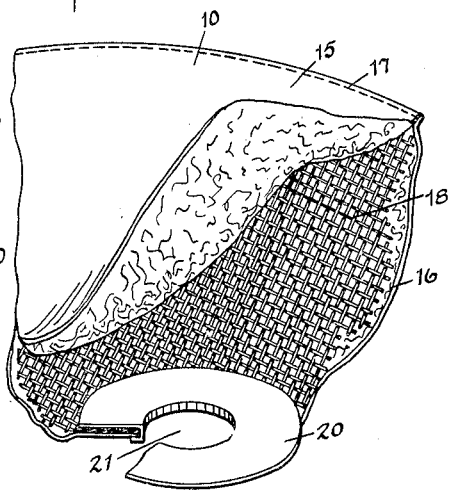

Sept. 17, 1929.     E. C. RANEY     1,728,305
OIL FILTER
Filed Sept. 29, 1928     3 Sheets-Sheet 3
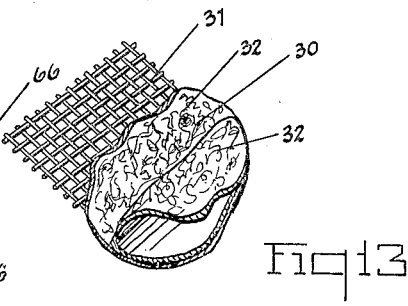
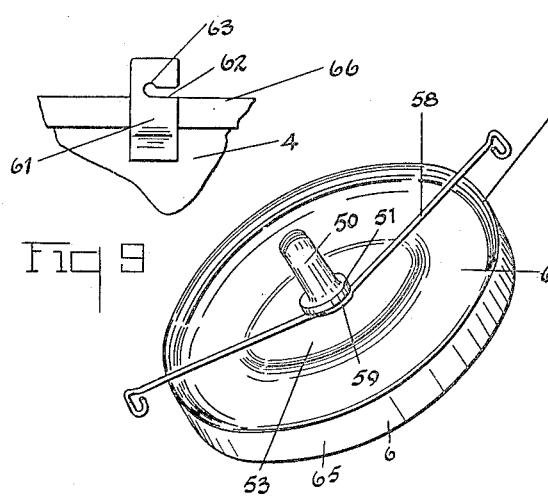
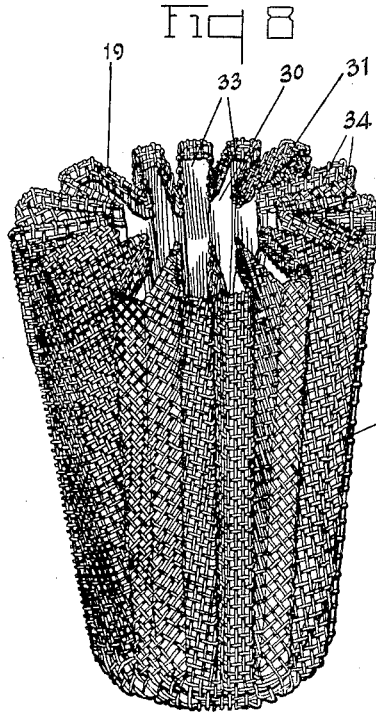
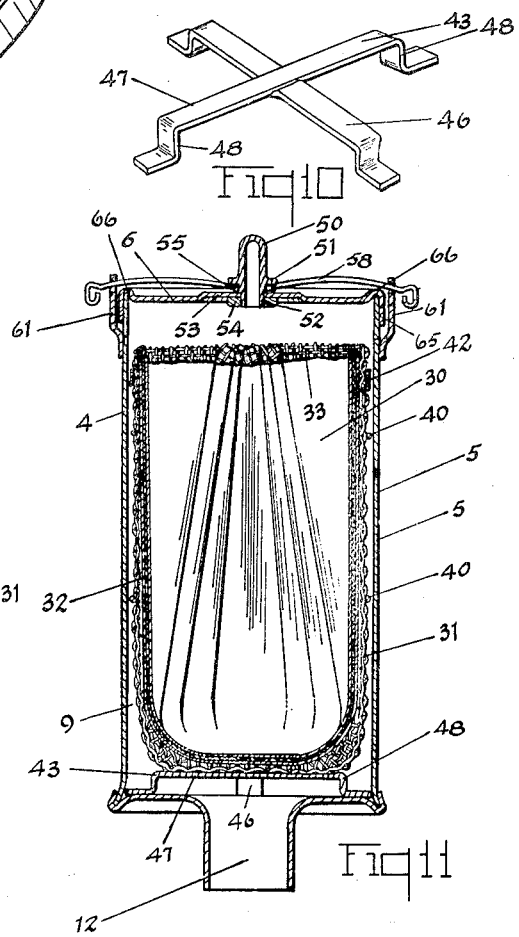
Inventor
Estel C. Raney
By
Attorney Patented Sept. 17, 1929

1,728,305

UNITED STATES PATENT OFFICE

ESTEL C. RANEY, OF COLUMBUS, OHIO

OIL FILTER

Application filed September 29, 1928. Serial No. 309,340.

My invention has for its object to provide an efficient filter that may be used for a great variety of purposes. More particularly, the invention has for its object to provide a readily replaceable and efficient oil filter element for filtering lubricating oil and which is so located that its condition is readily observable when lubricating oil is introduced into a machine, such as in an automobile engine. Thus the invention provides a filter element that is so formed and may be so cheaply made that it may be readily removed and replaced when the amount of the sediment collected is deemed to interfere with the oil filtration, and also one that may be located in the oil filling passage-way of the engine so that each time oil is inserted into the engine, the filter element will be observed. In this connection the invention also provides an overflow space within the passage-way so that there will be a free flow of oil in the said passage-way during the refilling, or resupplying, the engine with oil, and also a free overflow of, or by-pass to, the filter element during its filtering operations, in case the filter element becomes clogged with sediment or foreign material. The filter may be connected to any point, or points, in the oil circulatory system of the engine. Ordinarily, the filter element will be located at the end of a branch from the main oil circuit, the oil through the branch being returned through the filter to an oil reservoir, such as to the engine casing. The invention also has for its object other advantages and features which will appear upon examination of the drawings forming a part hereof and from the description hereinafter.

The invention is particularly applicable to the continuous filtration of the oil used to lubricate internal combustion engines in order that the foreign material that collects in the oil, during the operation of the engine, may be continuously removed and contamination of the oil with material that injures the bearings may be prevented. In the operation of constructions embodying the invention, the lubricating oil is maintained in a purified condition and, consequently, not only are the bearings protected, but plugging of the oil circulatory system is entirely avoided, which enables a constant maintenance of a supply of oil to the various bearings located in the oil circuit. The invention thus provides a filter element that is not only located in the oil circuit, but also in the oil filling tube or passage-way that communicates with the oil reservoir, usually the crank shaft casing, and, preferably, at the outer end of the passage-way where it may be observed by merely opening the oil filling passage-way.

The invention may be contained in filters that vary in their details of construction and, to illustrate a practical application of the invention, I have selected a filter construction as an example of the structures that contain the invention and shall describe the filter selected hereinafter. The filter referred to is shown in the accompanying drawings.

Fig. 1 illustrates a side view of a filter and indicates in a conventional way its location relative to the parts of an internal combustion engine. Fig. 2 is a view of a section taken on the plane of the line 2—2 indicated in Fig. 1, the view in Fig. 2, however, being greatly enlarged over that shown in Fig. 1. Fig. 3 is a view of a section illustrating the connection of the filter with the oil circulatory system of the engine. Fig. 4 is a view of a section taken on the plane of the line 4—4 indicated in Fig. 1. Fig. 5 is a side view of a filter element. Fig. 6 is a view of a vertical section of the upper end of the filter element. Fig. 7 is a broken view of parts of the filter element and is shown for the purpose of illustrating the construction of the filter element. Fig. 8 illustrates the details of construction of the cover of the shell shown in Fig. 1. Fig. 9 illustrates a side view of one of the locking ears for securing the cover to the shell. Fig. 10 illustrates a spider located in the bottom of the shell for supporting the filter element. Fig. 11 is a vertical section through the shell and illustrates a vertical section of a modified form of the filter element. Fig. 12 is a side view of the modified form of filter element illustrated in Fig. 11. Fig. 13 is a broken view used to illustrate the construction of the modified form of filter element shown in Fig. 12.

In many forms of construction, the oil systems of internal combustion engines are connected to an indicating instrument located on the instrument board of an automobile, whereby the pressure, created by the oil propelling means, may be readily observed. In Fig. 1 is shown, in a conventional way, the crank case 1 of an engine. A tube 2 connected to the oil feed of the lubricating system extends to the instrument board 3 where it may be connected to a suitable oil indicator. The tube 2 is tapped and the filter 4 is connected therewith. A suitable return is provided for the oil while at the same time the pressure of the oil within the tube 2 may be indicated by the instrument on the instrument board. The filter 4 will thus be located in a branch circuit of the oil system, the oil passing through the filter in parallel to other outlets of the oil into the crank case 1 of the engine.

The filter 4 has a shell 5 that is closed by means of a cover 6. In order that the filter element of the filter may be readily removed, and yet provide for the direction of the oil to the central part of the top of the shell, the connection with the pipe 2 is, preferably, made through the cover so that upon removal of the cover, the connecting pipe will not in anywise obstruct the removal of the filter element. In order that the cover 6 may be readily positioned to one side of the shell 5, when the filter is opened, the cover 6 is connected with the tube 2 through a jointed or flexible pipe. Preferably a pipe 7, having a coiled portion 8, is used. The coil 8 will permit ready opening of the shell and replacement of the cover 6 on the shell and afford an opening of substantially the entire upper end of the shell. When the cover is replaced, the oil will be fed, preferably, through the center of the cover into the shell and into the central part of the filter element located within the shell, from which point the oil distributes itself throughout the filter area of the filter element.

The filter element may partake of different forms, and I have shown in the drawings two forms of filter elements wherein there will be produced a substantially uniform filtration efficiency throughout a considerable period of use or mileage of operation of the engine. The filter element, shown in Figs. 2, 4, 5, 6, and 7, is so formed as to distribute the oil over an exceedingly large area of filtering material immediately upon deposition of the oil on the filter element. The filter element 10 occupies a large portion of the interior of the shell 5. The shell 5 is, preferably, cylindrical in form and the filter element 10 is likewise cylindrical, the diameter of the filter element being slightly less than that of the diameter of the shell in order to form a space within the shell for the free movement of the oil in case the quantity of the oil delivered to the filter element is such as to be in excess of that which may quite readily pass through the filter element. The space that is thus formed between the filter element and the wall of the shell, forms a by-pass for free movement of the oil through the filter in case of overflow of the filter element. The shell 5 is connected to the oil reservoir of the engine, such as to the crank shaft case 1 and, consequently, the oil will thus pass through the filter shell to the oil reservoir or crank case of the engine.

The shell 4 may be mounted at the outer end of the oil filling throat 11 of the engine 1, or, as in the form shown in the drawings, the filter may be provided with a suitable pipe 12 connected to the bottom of the shell 5 and which extends into the oil filling throat 11 of the engine casing 1. Thus, when the cover 6 is removed, the engine case 1 may be resupplied with oil by pouring the oil into the shell 5, the space 9 or by-pass 9 affording a free flow of the oil outside of the filter element 10 and within the shell 5 and through the pipe 12 and the oil filter throat 11 of the engine. Thus the filter element 10 will not in anywise interfere with the refilling of the crank case even in the coldest weather. Also, during the operation of the engine, there will be a free flow of oil through the by-pass in the shell, if the filter element 10 should become unduly clogged with sediment. Thus the lubricating circuit will not in anywise be interfered with even if the condition of the filter is entirely neglected and the filter element is used throughout the life of the engine.

The filter element 10 comprises a pair of relatively large sheets of fabric, preferably two in number, sewed together at their outer edges to form a bag. The wall of the bag provides an exceedingly large filtration area through which the oil may pass and also a large area over which the sediment may collect and, consequently, provides for the maintenance of a uniform filtration efficiency throughout a long period of use or large mileage. Preferably, an opening is formed in the central part of one of the sheets and the sheets are so folded as to locate their edge portions below the opening which causes the oil, that is introduced into the filter element through the opening, to flow and distribute itself immediately throughout substantially the entire area of the two sheets. In order to thus locate the edge portions of the sheets below the opening formed in a central part of one of the sheets, the sheets may be folded in a great variety of ways. In the form of construction shown in the drawings, the sheets are made circular and are folded into sectors and the opening in the central part of one of the sheets is located beneath the oil inlet of the filter so that the oil will enter the bag and move through the opposite walls formed by the sheets, largely, through the area in proximity to the edges of the sheets where they are joined together.

Thus, in the form of construction shown, the sheets of fabric 15 and 16 are made circular in form and are sewed together along their edge portions as at 17. The sheets are, preferably, formed of canton flannel, the nap of the flannel being located on the inside of the bag that is thus formed. Also, in order to prevent possible clinging of the two sheets to each other, by reason of their both becoming saturated with the oil, and to insure a free movement of the oil to the edge portion of the filter element, a wire mesh 18, such as ordinary household screen mesh, cut in the form of a disc and having a diameter slightly smaller than the diameter of the sheets 15 and 16, is located between the sheets which enables the oil to freely flow down between the sheets. The wire mesh 18, moreover, operates to maintain the folded form of the filter element.

The filter element is folded, preferably, so as to form segments having their greater widths located at the lower end so as to space the sides, such as the sides 19 of the segments from adjoining segments, in order to permit free flow of the oil from the filter element to the bottom of the shell 5. In the form of construction shown, the opening through which the oil is introduced into the filter element, is formed in the central part of the sheet 16 and the filter element is folded so as to locate the sheet 15 on the inside and the sheet 16 on the outside. Moreover, the folds are so made as to cause the filter element to conform to a cylinder, the segments extending from the upper corner of the cylinder to the bottom of the cylinder, the circle through the upper corners of the segments being substantially the same as the diameter of the filter element and the lower edges of the segments extending inwardly. A metal disc 20, having an opening 21, is located within the bag and at the central part of the sheet 16. The edge of the disc 20 about the opening 21 may be crimped over so as to engage the edge of an opening formed in the mesh 18 and the edge of the opening formed in the sheet 16. In folding, the corners of the sectors will be located in proximity to the periphery of the disc 20. The disc 20 will also locate the opening 21 centrally so that the axis of the shell will pass through the center of the opening 21 and will maintain the opening 21 at a point below the oil inlet into the filter.

For convenience of handling the filter element, it may be surrounded by or enclosed in a wire mesh 22 made in the form of a cylinder and having its side edges connected together. The wire mesh 22 forms an exterior cover through which the oil, that moves outward through the sheet 16, may readily pass, and it provides a means for maintaining a filter element in shape whereby the filter element may be readily inserted or removed from the shell 4. In order to eliminate the raw edges produced by cutting the mesh, the end edges of the mesh may be dipped in solder, as indicated at 23.

When the filter element has been folded, it locates the central portion 24 of the sheet 15 at a point below and in proximity to the disc 20 and which will necessarily sag by reason of its own weight and by reason of the weight of the oil that flows into the filter element through the opening 21. In order to prevent undue sagging of this portion of the filter element, a ring 25 may be located within the folded filter element and when the segments are bound in position, by insertion of the folded sheets in the tube 22 of wire mesh, the ring 25 will be locked in position which securely holds the central portion 24 of the sheet 15 in position and causes immediate distribution of the oil as it enters through the opening 21 to the interior of the segments in which the sheets are folded and, consequently, distributes the oil throughout substantially the entire area of both sheets which likewise causes distribution of the sediment throughout substantially the entire area of both of the sheets. The oil will thus pass through the very large area equal to, substantially, the summation of the areas of the sheet 15 and the sheet 16, and will pass inwardly through the sheet 15 and downwardly between the segments and the space formed between the lower inner corners of the segments to the lower end of the shell and outwardly through the sheet 16 and between the segments and downwardly between the segments and the space 19 to the lower end of the shell. From the lower end of the shell the oil will be conducted back to the oil reservoir of the engine through the pipe 12.

In the form of filter element shown in Figs. 11, 12, and 13, the filter element is also formed of a fibrous material that is backed and supported by a fine wire mesh, such as the ordinary household screen mesh and the fibrous material is so shaped as to present a large filtration area through which the oil may pass, means being provided as in the form of construction shown in Figs. 2, 4, 6, and 7, for the by-passing of the oil through the filter, in case the oil exceeds that which would ordinarily pass through the filter element, such as through the space 9 that may be located between the filter element and the wall of the shell 5.

In the construction shown in the figures, the fibrous material 30 is formed of sheet material and is cut in the form of a disc and is placed on a fine wire screen 31, also preferably cut in the form of a disc but of slightly larger diameter than the disc of sheet material 30. The edge of the wire mesh 31 is bent over the edge of the sheet material 30 and the two parts thus secured together are folded to substantially conform to a cylindrical shape, the wire mesh operating to maintain the sheet fibrous material in its folded form.

The fibrous material 30 may be formed of two layers of canton flannel that are so placed relative to each other as to locate the nap side 32 of one piece in contact with the nap side 32 of the other piece as shown in Fig. 13. The layers are cut in the form of discs and are backed by the wire screen 31. Preferably, the edge of the screen is dipped in solder, as indicated at 33, to cover the raw edge formed by cutting the wire mesh. The discs are folded so as to form a plurality of cells or segments 34, that extend radially from the axis of the filter element so as to form a central opening substantially cylindrical as defined by the inner folds of the sheet material. The sides of the cells are, preferably, spaced from each other whereby there will be a free flow to all parts of the filter element from the central portion thereof and also a free flow of the oil from the exterior surface of the cells. Preferably, the cells are formed by folding the sheet material so as to form sectors having their angles located at the lower end of the filter element and their greater widths located at the top of the filter element, substantially as shown in Fig. 12. Thus, by my invention, I have provided an exceedingly simple means whereby a large filter area is presented to the liquid to be filtered, particularly when the level of the oil within the filter element rises to near the top of the filter. If desired, wires 40 may be used for maintaining the filter element in substantially cylindrical form so as to leave a relatively large space 9 for free flow of oil through the shell 5, on the outside of the filter element.

In order to insure an adequate space within the shell 5 for the movement of oil, where either of the filter elements are used, the shell 5 is provided with a spacing means, such as the strip 42 and the spider 43. The spacing strip is bent to conform substantially to the circumference of the filter element and to form the spacing portions 44 that dispose body portions 45 of the strip in spaced relation and, preferably, concentric to the interior surface of the cylindrical wall of the shell 5. The strip 42 may be secured as by welding or soldering of the spacing portions 44 to the shell 5 where they may make contact with the interior surface of the shell 5. The spider 43 may be formed of a pair of strips 46 and 47 that extend crosswise to each other and have bent end portions 48 that space the body portions of the strips from the bottom of the shell 5. The spider may also be soldered or spot welded to the shell at the points where the bent end portions make contact with the bottom of the shell 5. Thus, when the crank case 1 is being supplied with oil, the oil may be poured into the shell and over the filter element which will quickly fill and overflow and the oil will readily pass through the shell, that is, through the space or by-pass 9, and through the pipe 12 into the crank case of the engine. Also, in case the filter element should become charged with excess of foreign material, collected in the filtration of the oil, the filter element may be readily by-passed through the space 9 for the free flow of oil that is introduced into the filter through the pipe 7 and the cover 6 of the shell.

The cover 6 is connected with the pipe 7 by means of an elbow 50 which is provided with a flange 51 and a threaded end 52. The elbow 50 may be inserted through an opening formed in the cover 6 which, preferably, has a raised central portion 53. The elbow is secured to the cover by means of a nut 54 by which the edge portion of the cover about the opening may be clamped between itself and the shoulder 55 formed on the elbow. The flange 51 is so located as to be spaced from the upper surface of the raised central portion 53 so as to form a channel around the base of the elbow. A relatively stiff elastic wire 58 is looped centrally about the elbow and within the channel formed by the flange 55, whereby the wire 58 will be rotatably secured by its central looped portion 59 within the channel. This construction provides for ready rotation of the ends of the wire about the elbow and thus permits desired location of the outer ends of the wire and at the same time maintains the ends of the wires in diametrically opposite positions with reference to the center of the cover. The ends of the wire may be looped to afford a convenient means for manipulating the wire in securing the cover 6 in position on the upper end of the shell 5.

The upper end of the shell 5 is provided with a pair of ears 61 in which are formed the open ended slots 62, the upper edges of which being provided with the recesses 63. The ears 61 are located diametrically opposite with reference to the axis of the shell 5. The cover 6 has a flange 65 and the ears 61 are connected to the side of the shell at a point located a distance from the upper edge of the shell greater than the width of the flange and, consequently, the cover may be placed in any position with reference to the shell and without regard to the location of the ears 61. When the cover 6 is placed on the shell, it may be secured thereto by inserting the ends of the elastic wire 58 in the slots 62 of the ears and moving the end portions of the wires laterally until they engage in the recesses 63. When one end of the wire 58 is inserted in position in one ear 61, the other end of the wire 58 will be located in position so that it may be easily bent to one side and depressed and moved laterally in the slot 62 of the other ear to enable it to engage in the recess 63 of the said other ear. If desired, the cover may be beaded along the corner 66 in order to depress the peripheral portion within the corner below the top of the shell to prevent oil from collecting at the upper edge of the shell in any material quantity.

A metering plug 56, having an orifice of the desired size, is located intermediate the oil inlet of the filter and the point of connection of the filter with the supply pipe 2. Preferably, the metering plug 56 is located in the elbow 50. The metering plug 56 operates to prevent short circuiting of the oil streams through the motor bearings and maintains the oil pressure in the oil feed line of the lubricating system. Plugs having different sized orifices may thus be inserted to maintain any desired oil pressure in the line or any desired rate of filtration.

Thus my invention provides an exceedingly efficient filter that may be made at a comparatively low cost of production and one that is readily adaptable for use in connection with a great variety of fluids. The invention particularly provides an exceedingly simple means for the continuous filtration of the oil of internal combustion engines and wherein a large filter area is presented for the filtration of the oil. The liquid is thus efficiently filtered while subjected to pressure created by gravity only. The filter, however, may be also used in filters where the pressure of the liquid to be filtered is subject to an artificial pressure to force the liquid through the filter. For filtering lubricating oil of an engine, I find it preferable to provide for the free flow of the oil into the filter element, a free flow through the filter element, and a free overflow or by-pass for the oil in case of the collection of an excess of sediment. Inasmuch as the particular construction described may be located in the oil filling inlet of the engine casing, the free overflow or by-passing of the filter element enables the usual freedom of movement of the oil required during the filling operation and also so disposes the filter element that it will be readily observed as to the collection of sediment. If there is an excess of sediment, the filter element may be replaced by a fresh filter element at a very low cost.

I claim:

1. In a filter for liquids, a filter element formed of two layers of sheet material connected together at their edges, and means for directing the liquid into the filter element at a point between the layers and at the central portions thereof, the edges of the layers located below the level of the central parts of the layers.

2. In a filter, a filter element for containing a liquid during filtration, the filter element formed to have a filtration area that increases as the depth of the liquid increases and wherein the rate of change in the increase of the area becomes less as the depth increases.

3. In combination with an engine crank case, a removable filter element formed to contain oil during filtration and located in the oil filling conduit of the crank case, the filter element when in place in the conduit forming a by-pass to permit free flow of oil from the filter side of the filter element to the filtrate side of the filter element.

4. In a filter for liquids, a filter element formed of two layers of sheet material joined at their edges, one of the layers having an opening for receiving the liquid to be filtered, a portion of the other of the said layers located beneath and close to the edge of the opening and both of said layers gathered below the edge of the opening.

5. In a filter for liquids, a bag of porous sheet material, two opposite portions of the wall of the bag located in parallel and closely spaced relation to each other, one of the said portions having an opening and the parts of the said portions immediately surrounding the opening folded on each other to locate the folded parts of the wall of the bag below the said opening.

6. In a filter for liquids, a bag formed of two layers of porous sheet material joined together at their edges, one of the layers having an opening for receiving the liquid and the said layers folded on lines extending radially from the said opening to locate the folded parts of both layers of the bag below the said opening.

7. In a filter for liquids, a filter element formed of porous sheet material having edge portions folded to form segments whose vertices lie within a circular part of the sheet material, and the segmental parts located below the circular part, the said circular part having an opening for receiving liquid to be filtered, and a second sheet of porous material for closing the interior of the segments.

8. In a filter for liquids, a filter element formed of two layers of porous sheet material secured together at their edges, the edge portions of the layers of the sheet material folded to form segments whose vertices lie within closely positioned circular parts of both layers of the sheet material, the segmental parts being located below the circular parts, one of the layers of the sheet material having an opening within its circular part for receiving the liquid to be filtered.

9. In a filter for liquids, a filter element formed of two layers of sheet material, one of the layers having an opening located in its central part for permitting free flow of the liquid to a point between the layers, the central part of the other of the layers located below the said opening and in close proximity to the central part of the first named layer, the outer edges of the layers located below the level of the opening.

10. In a filter for liquids, a shell, a filter element located in the shell, a cover for closing the shell, a pipe connected to the cover and movable therewith for directing a liquid into the filter element, the shell having means for maintaining a part of the exterior surface of the filter element in spaced relation with the interior of the shell to form a bypass from the filter side of the filter element to the filtrate side, the filter having an opening within the line of the inlet of the pipe through the cover for receiving the liquid directed through the movable part of the pipe and the cover.

11. In a filter for liquids, a shell, a filter element located in the shell, a cover for closing the shell, a pipe connected to the cover and movable therewith for directing a liquid into the filter element, the shell having means for maintaining a part of the exterior surface of the filter element in spaced relation with the interior of the shell to form a bypass from the filter side of the filter element to the filtrate side, the filter formed of layers connected together at the edges of the layers, one of the layers having an opening located in its central part and in line with the inlet through the pipe and cover for receiving the liquid between the layers, the central part of the other of the layers located in proximity to the central part of the first named layer and the outer edges of the layers located below the level of the opening.

12. In a filter for liquids, a filter element formed of two layers of sheet material connected together at their edges, one of the layers having an opening located in its central part for permitting free flow of the liquid between the layers, the central part of the other of the layers located below the said opening and in close proximity to the edges of the opening, the outer edges of the layers located below the level of the central parts of the layers, and a spacing means for spacing the layers to permit free flow of the liquid between the layers to the edges of the layers.

In witness whereof I have hereunto signed my name to this specification.

ESTEL G. RANEY.